United States Patent
Leisinger et al.

(10) Patent No.: US 11,621,610 B2
(45) Date of Patent: Apr. 4, 2023

(54) COOLING ASSEMBLY FOR AN ELECTRIC MACHINE

(71) Applicant: Caterpillar Inc., Peoria, IL (US)

(72) Inventors: Keith A. Leisinger, Brimfield, IL (US); Joseph D. Tigue, Peoria, IL (US); Gregory T. Austin, Peoria, IL (US); Ranjit Singh, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 244 days.

(21) Appl. No.: 16/773,395

(22) Filed: Jan. 27, 2020

(65) Prior Publication Data

US 2021/0234436 A1    Jul. 29, 2021

(51) Int. Cl.
| | |
|---|---|
| *H02K 9/197* | (2006.01) |
| *H02K 1/32* | (2006.01) |
| *H02K 5/20* | (2006.01) |
| *H02K 9/00* | (2006.01) |
| *H02K 9/14* | (2006.01) |

(52) U.S. Cl.
CPC .............. *H02K 9/197* (2013.01); *H02K 1/32* (2013.01); *H02K 5/20* (2013.01); *H02K 5/203* (2021.01); *H02K 9/00* (2013.01); *H02K 9/14* (2013.01)

(58) Field of Classification Search
CPC .. H02K 9/19; H02K 5/20; H02K 3/24; H02K 9/193; H02K 5/203; H02K 5/207; H02K 1/197; H02K 1/32; H02K 9/00; H02K 9/14
See application file for complete search history.

(56) References Cited

U.S. PATENT DOCUMENTS

| | | |
|---|---|---|
| 7,009,317 B2 | 3/2006 | Cronin et al. |
| 7,626,292 B2 | 12/2009 | Baumann et al. |
| 7,834,492 B2 | 11/2010 | Iund et al. |
| 8,067,865 B2 | 11/2011 | Savant |
| 8,183,723 B2 | 5/2012 | Fee et al. |

(Continued)

FOREIGN PATENT DOCUMENTS

| | | | | |
|---|---|---|---|---|
| EP | 2346146 | | 7/2011 | |
| EP | 3112713 A1 | * | 1/2017 | ........... H02K 5/1732 |

(Continued)

OTHER PUBLICATIONS

Puls (WO2017211360 A1) English Translation (Year: 2017).*

(Continued)

*Primary Examiner* — Tulsidas C Patel
*Assistant Examiner* — Robert E Mates
(74) *Attorney, Agent, or Firm* — von Briesen & Roper, s.c.

(57) ABSTRACT

A cooling assembly for an electric machine is disclosed. The cooling assembly may include a generally cylindrical cooling jacket for receiving a shaft, a rotor and a stator. Further, the cooling jacket jacket may be disposed in an electric machine housing. Additionally, the cooling assembly may include at least two first passages in the cooling jacket for circulating a first coolant and at least one second passage in the cooling jacket for circulating a second coolant, the second passage being disposed between the at least two first passages. Further, the cooling assembly may include a third passage on an exterior of the machine housing, the third passage extending through the housing to fluidly connect the at least two first passages and bypass the second passage.

18 Claims, 5 Drawing Sheets

(56) References Cited

U.S. PATENT DOCUMENTS

| | | |
|---|---|---|
| 8,558,422 B2 | 10/2013 | Baumann et al. |
| 8,614,527 B2 | 12/2013 | Nagao et al. |
| 9,287,754 B2 | 3/2016 | Buttner et al. |
| 10,038,355 B2 | 7/2018 | Brauer et al. |
| 10,272,767 B1 | 4/2019 | Tang et al. |
| 2009/0102298 A1 | 4/2009 | Savant et al. |
| 2009/0127946 A1* | 5/2009 | Fee .................... H02K 5/20 310/64 |
| 2010/0109461 A1* | 5/2010 | Kato .................... B60K 6/405 310/90 |
| 2011/0025147 A1* | 2/2011 | Owng .................... H02K 5/18 310/63 |
| 2012/0286596 A1* | 11/2012 | Creviston .............. H02K 9/19 310/59 |
| 2015/0280522 A1 | 10/2015 | Austin et al. |
| 2016/0056683 A1* | 2/2016 | Nakanishi ............ H02K 5/203 310/54 |
| 2016/0141921 A1 | 5/2016 | Kubes |
| 2018/0287452 A1* | 10/2018 | Kim .................... H02K 5/20 |
| 2018/0323683 A1 | 11/2018 | Stieger et al. |
| 2019/0077248 A1 | 3/2019 | Kim et al. |

FOREIGN PATENT DOCUMENTS

| | | | |
|---|---|---|---|
| EP | 3337011 A1 * | 6/2018 | ............... H02K 5/20 |
| WO | 2012154423 | 11/2012 | |
| WO | WO-2017211360 A1 * | 12/2017 | ............... H02K 5/20 |

OTHER PUBLICATIONS

Written Opinion and International Search Report for INternational Patent Appln No. PCT/US2021/013547, dated Apr. 26, 2021 (12 pgs).

* cited by examiner

COOLING ASSEMBLY FOR AN ELECTRIC MACHINE

TECHNICAL FIELD

The present disclosure generally relates a cooling assembly for an electrical machine and, more particularly, relates to a cooling jacket having multiple coolants circulating therein.

BACKGROUND

In manufacturing, mining, construction, transportation and other fields of endeavor, it is often necessary to employ electric machines. Electric machines such as motors and generators may be used to generate mechanical power in response to an electrical input or to generate electrical power in response to a mechanical input. An electric machine (whether the device acts as a motor, generator, alternator, rotary converter, etc.) typically includes a stator, which is stationary, i.e., non-rotating, and a rotor, which rotates within the stator, and a machine housing. The stator generally comprises a core of ferromagnetic material and windings, consisting of coils of insulated wires or conductors, wound about pole pieces. The rotor may also include a core of ferromagnetic material. The construction of cores, windings and other physical aspects of traditional motors, while generally relevant, will not be discussed further herein as those of skill in the art will be familiar with traditional motor constructions.

Electric motors and generators generate considerable heat and require an efficient cooling system. For example, magnetic, resistive and mechanical losses within electrical machines during mechanical and electrical power generation cause a build up of heat in the stator, which is preferably dissipated in order to avoid damage, malfunction and/or failure of the machine, as well as to improve the efficiency of the machine. One of the limitations on the power output of an electric machine may be its capacity to cool the stator and dissipate this excess heat. As technology evolves, however, the power density of electric machines is increasing, and such machines are becoming more difficult to cool. Cooling stator cases or cooling jackets, which may be positioned between the stator and the housing of an electric machine, provide an excellent means for cooling these machines. Therefore, motors and generators are often equipped cooling jackets, the cooling jackets being provided with grooves or passages for circulating a coolant between the cooling jacket and the machine housing. Specifically, circulating water, oil or air through a cooling jacket aids in dissipating excess heat and therefore cooling of these electric machines. Common coolants employed in the industry include water and ethylene glycol mixtures (WEG), as well as oil coolants, though not commonly employed together in the same cooling jacket.

One exemplary arrangement for dissipating heat from an electric machine is disclosed in U.S. Patent Application No. 2016/0141921 of Kubes ("the '921 publication"). Specifically, the '921 publication discloses a heat exchanger disposed between a stator and an electric machine housing, the exchanger being a sleeve or jacket having adjacent helical coolant flow paths on or through an outer surface of the sleeve. This configuration allows for double helical flow paths for two different coolants around the stator. However, this prior art disclosure does not provide any alternative arrangements for multiple cooling paths other than the disclosed adjacent double helical flow paths.

The disclosed cooing assembly and methods for cooling an electric machine are directed to overcoming one or more of the limitations set forth above and/or other problems of the prior art.

SUMMARY

In accordance with one aspect of the present disclosure, an electric machine is disclosed. The disclosed electric machine may include a housing, a shaft, a rotor and a stator. Further, the electric machine may include a cooling assembly having a cooling jacket disposed in the housing. The cooling jacket may have an inner surface defining a generally cylindrical cavity for receiving the stator and an outer surface having at least two generally annular first grooves for circulating a first coolant. In addition, the outer surface may have at least one generally annular second groove for circulating a second coolant, the second groove being disposed between the at least two first grooves. Further, the cooling assembly may include a passage on the exterior surface of the housing and extending through the housing to fluidly connect the at least two first grooves and bypass the second groove.

In accordance with another aspect of the present disclosure, a cooling assembly for an electric machine is disclosed. The cooling assembly may include a generally cylindrical cooling jacket configured to receive a shaft, a rotor and a stator; and the cooling jacket may be configured to be disposed in an electric machine housing. The cooling assembly may also include at least two first passages in the cooling jacket for circulating a first coolant and at least one second passage in the cooling jacket for circulating a second coolant, the second passage being disposed between the at least two first passages. Further, the cooling assembly may include a third passage on an exterior of the machine housing, the third passage extending through the housing to fluidly connect the at least two first passages and bypass the second passage.

In accordance with yet another aspect of the present disclosure, a method of cooling an electric machine is disclosed. The disclosed method may include the step of providing a cooling jacket, the cooling jacket received in an electric machine housing and having at least two first coolant passages and at least one second coolant passage, the second coolant passage being disposed between the at least two first coolant passages. In addition, the disclosed method may include the step of providing a third passage on an exterior of the machine housing, the third passage fluidly connecting the at least two first coolant passages and bypassing the second coolant passage. Further, the disclosed method may include the steps of circulating a first coolant through the at least two first coolant passages and the third passage, and circulating a second coolant through the second coolant passage.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

The presently disclosed cooling assembly and method for cooling an electric machine overcome certain limitations in the prior art. The disclosure may apply to an electric motor or generator that performs operations associated with an industry such as construction, farming, mining, manufacturing, transportation or any other industry known in the art. Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
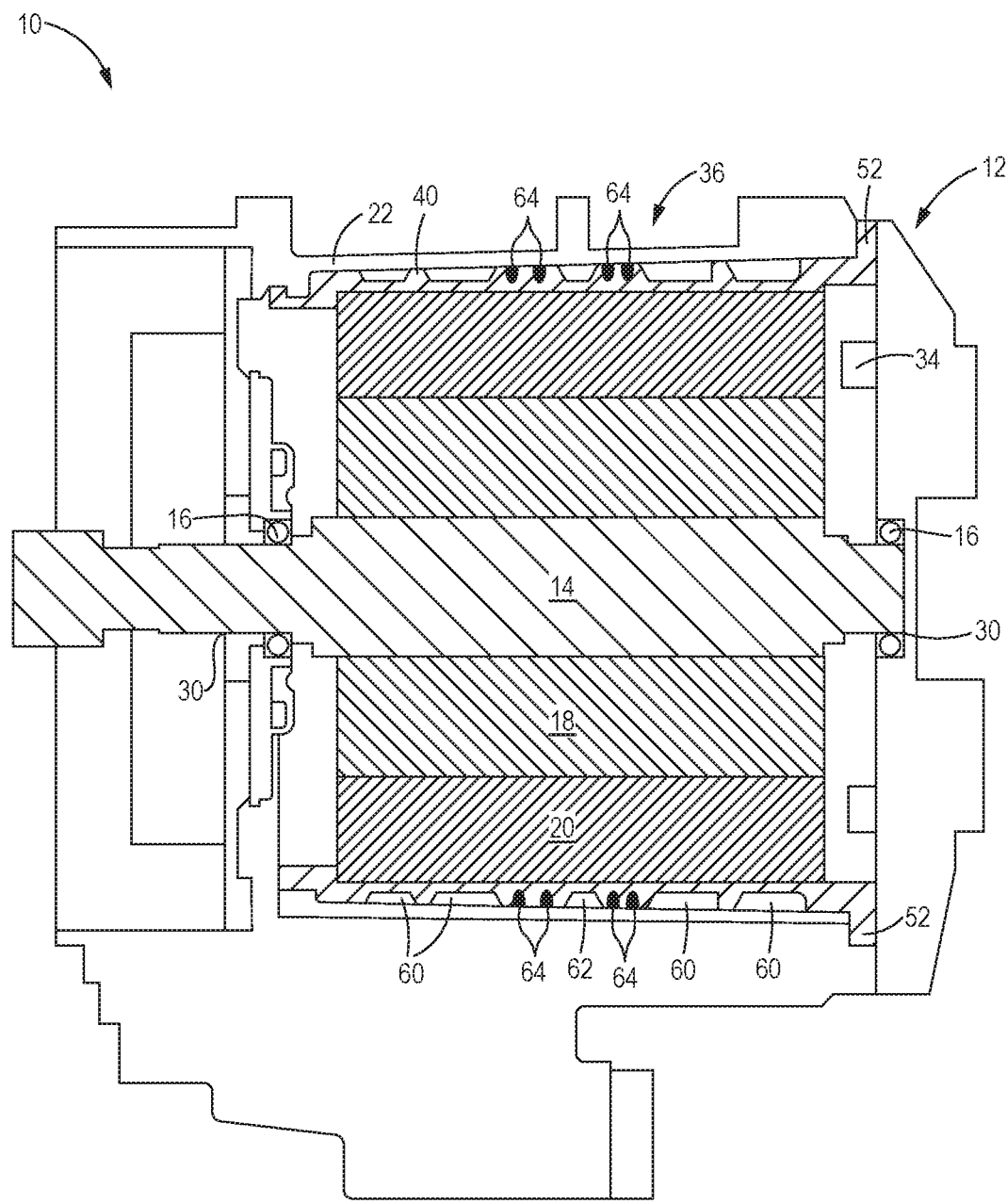
FIG. 1 is a cross-sectional illustration of an exemplary disclosed electric machine, in accordance with the present disclosure.

FIG. 1 illustrates an exemplary electric machine 10. The electric machine 10 may be a generator or a motor, or selectively function as both a generator and a motor. For example, the electric machine 10 may be driven (e.g., by an engine) to produce electricity, such as in a hybrid vehicular application or a stationary power generation application. Alternatively, the electric machine 10 may be powered with electricity to produce a mechanical rotation, such as in an engine starting application or an electric winching application. It is also contemplated that the electric machine 10 may function in some instances as a generator and in other instances as a motor, such as in an electric powertrain propelling and braking application.

Regardless of the application, the electric machine 10 may include, among other things, a housing 12, a shaft 14 rotatably supported within housing 12 at opposing ends by bearings 16, a rotor 18 operatively coupled to rotate with the shaft 14, and a fixed stator 20 that annularly surrounds the rotor 18. When the shaft 14 and the rotor 18 are mechanically driven to rotate within the housing 12, an associated rotating magnetic field may produce an electric current within the stator 20. Likewise, when an electric current is passed through the stator 20, a magnetic field may be generated that causes the rotor 18 and the shaft 14 to rotate. It is contemplated that the electric machine 10 may contain additional or different components such as, for example, a control system, a processor, power electronics, one or more sensors, a power storage device and/or other components known in the art. Such additional systems and components are not within the scope of the present disclosure and, thus, will not be discussed herein in greater detail.

As shown in FIG. 1, the housing 12 may include a generally cylindrical shell 22 and one or more end covers. The shell 22 may substantially enclose the shaft 14, the bearings 16, the rotor 18 and the stator 20. It is contemplated that, in some embodiments, the shell 22 may have two open ends, or may have one open end and one closed end, depending on the application. The housing 12 may include a centrally located through-hole 30 that allows the extension of the shaft 14 through the opposing ends of the housing 12. It is further contemplated that the shaft 14 may protrude through one or both or ends of the housing 12, depending on the application. Portions of the housing 12 will be discussed with respect to the cooling functions disclosed, but those of skill in the art will appreciate that the housing 12 will typically include other aspects, not described herein, for purposes of mounting, rigidity, electrical connectivity and so on depending upon the application and needs. The housing 12 may be comprised of a material with a relatively high thermal conductivity such as a metal. Advantageously, a metal housing allows for effective heat transference.

The rotor 18 may be housed within the stator 20. The rotor 18 may be formed of typical material for an electric motor or generator, and may be configured to rotate within the stator 20 to create torque. Formed in a cylindrical shape, the rotor 18 may have an open center to be fixedly connected to the shaft 14, and to interact with a magnetic field within the electric machine 10 in response to a rotation of the shaft 14. In one embodiment, the rotor 18 may include a stack of steel laminates and multiple radially protruding portions also known as rotor teeth (not shown). As each protruding portion is rotated to interact with the magnetic field of the stator 20, a corresponding current may be produced.

The stator 20 may be fixed to the housing 12 to produce the magnetic field that interacts with the radially protruding portions of the steel laminates. Like the rotor 18, the stator 20 may also include laminates of steel formed into teeth (not shown). The teeth of the stator 20 may protrude radially inward toward the outwardly protruding rotor teeth of the rotor 18. In some applications, the stator 20 may also include coils or windings 34 of copper wire to form a plurality of poles. As the rotor 18 is rotated to interact with the magnetic field of the stator 20, electrical current may be sequentially generated from the windings 34 through each of the plurality of poles.

Figure 2:
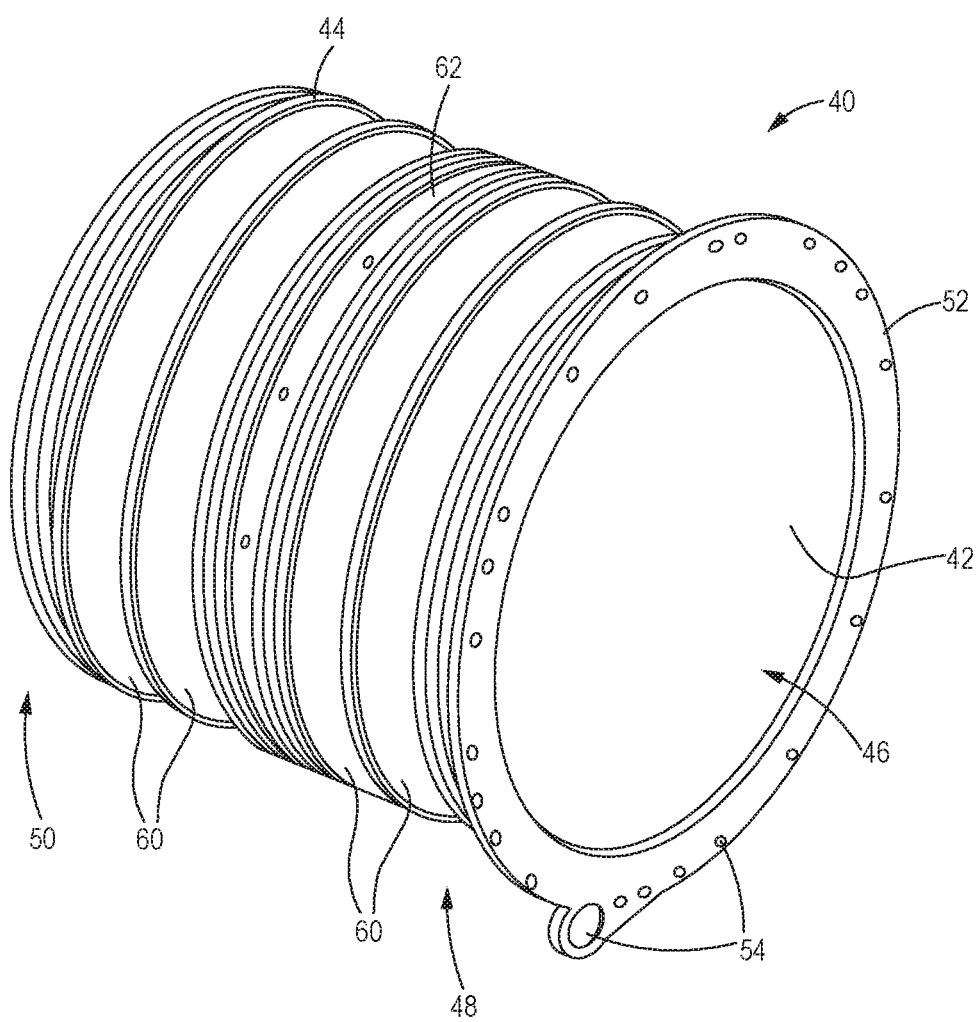
FIG. 2 is a perspective view of an exemplary embodiment of a cooling jacket, in accordance with the present disclosure.

As also illustrated in FIG. 1, the electric machine 10 may include a cooling assembly 36 for reducing heat in the electric machine 10 by directing at least two coolants throughout or near the primary heat-generating components of the electric machine 10, as described in detail below. The cooling assembly 36, among other things, includes a generally cylindrical cooling jacket 40 disposed between the stator 20 and the housing 12. FIG. 2 illustrates an exemplary, generally hollow-bodied cooling jacket 40. The cooling jacket 40 may have inner and outer coaxial surfaces 42, 44, respectively. The inner surface 42 defines a generally cylindrical cavity 46. The body of the cooling jacket 40 may include a first axial end 48 and a second axial end 50. The first axial end 48 may be a first terminal end and the second axial end 50 may be a second terminal end. The cavity 46 defined by the inner surface 42 of the cooling jacket 40 may extend from the first axial end 48 to the second axial end 50, and may be open at the first axial end 48 and also open at the second axial end 50. The cavity 46 may have a uniform diameter and may be configured for receiving the stator 20. The figures illustrate the cooling jacket 40 and housing 12 as being generally cylindrical, however, it should be appreciated that multiple geometries of cooling jackets and housings are contemplated within the scope of the present disclosure. A mounting flange 52 may be located adjacent the first axial end 48, the flange 52 configured for coupling the cooling jacket 40 with the housing 12. To facilitate the coupling, the flange 52 may include bolt holes 54 formed therein, some of which are illustrated in FIG. 2. Coupling between the cooling jacket 40 and the housing 12 may include any number of elements, such as the flange 52, bolts, lugs or any other suitable means known in the industry for fastening or coupling parts. For example, the coupling element may be a clamping shoulder or the like.

As further illustrated in FIG. 2, the cooling jacket 40 may include multiple generally circumferential grooves formed in the outer surface 44 for circulating multiple coolants through passages created between the grooves and the housing 12, as described in detail below. The grooves may be positioned adjacent to one another along the cooling jacket length extending from the first axial end 48 to the second axial end 50. The grooves may include sets of axially advancing grooves, each set adapted to direct cooling fluid in an axially advancing direction through adjacent grooves. Alternatively, single annular grooves that do not advance a coolant axially are also contemplated, and may intervene with the independent, axially advancing grooves. As used herein, the term "axially advancing" should be understood to mean that grooves have a configuration and/or orientation such that coolant flows in a direction that advances relative to a longitudinal center axis of the cooling jacket 40. Stated another way, axially advancing grooves will not be positioned at a uniform axial location about the longitudinal center axis, but will instead be positioned such that they transition fluid toward or away from the first axial end 48 or the second axial end 50. Throughout the present disclosure, the fluid pathways in which the first coolant circulates are interchangeably referred to as first grooves 60 or first passages 60; and the fluid pathways in which the second coolant circulates are interchangeably referred as second grooves 62 or second passages 62. The first and second grooves/passages 60, 62 in the outer surface 44 of the cooling jacket 40 may be of any width and depth appropriate for the particular application, and depending on the number and sequence of the grooves/passages 60, 62 desired.

In the exemplary embodiment of FIG. 2, for example, the cooling jacket 40 may include multiple generally annular first grooves 60 for circulating a first coolant. While the first grooves 60 are illustrated as two sets of first grooves 60, each set advancing and spiraling twice around the cooling jacket 40 (see also FIG. 4), any number of first grooves 60 and spirals around the cooling jacket 40 are contemplated in the present disclosure. In addition, the cooling jacket 40 may include a generally annular second groove 62 for circulating a second coolant. The second groove 62 may be disposed between the first grooves 60, and while the second groove 62 is illustrated as a single groove, multiple second grooves 62 for circulating a second coolant, as well as axially advancing and spiraling second grooves 62, are contemplated herein. In addition, while FIG. 2 illustrates a sequence of first grooves 60, a second groove 62, and first grooves 60 on the outer surface 44, from one end of the cooling jacket 40 to the other, additional sequences of grooves 60, 62 are contemplated herein. For example, additional second grooves 62 could also be disposed on opposite sides of the first grooves 60, adjacent the ends 48, 50 of the cooling jacket 40. Alternatively, the illustrated sequence of grooves 60, 62 may be repeated multiple times on the outer surface 44, along the length of the cooling jacket 40. Depending on the particular application, the machine size and the heat transfer requirements, numerous variations of the illustrated embodiment are possible without departing from the scope of the present disclosure.

The circulation of coolants through the grooves or passages 60, 62 of the cooling jacket 40 results in multiple coolant contacts between and with both the cooling jacket 40 and the housing 12, thereby removing heat and cooling the stator 20. As understood in the art, the cooling performance of the cooling assembly 36 may be optimized through the shape and length of the grooves 60, 62 in the cooling jacket 40, as well as the velocity of the coolants moving there through.

The cooling jacket 40 of the present disclosure may be fabricated through a casting process. Within the context of this disclosure, casting should be understood to mean any manufacturing process by which a molten material such as metal or plastic is introduced into a mold, allowed to solidify within the mold and then ejected or broken out to make a fabricated part. Casting is used for making parts of complex shape that would be difficult or uneconomical to make by other methods, such as cutting from solid material. Types of casting known in the art include sand casting, die casting, permanent mold casting, centrifugal casting, continuous casting and the like. Alternatively, the cooling jacket 40 and/or elements thereof may be machine manufactured, as also known in the art. Optionally, and also contemplated herein, the cooling jacket 40 may be cast directly into the housing 12 of the electric machine 10. Whether by casting or machining, the outer surface 44 of the presently disclosed cooling jacket 40 includes, among other things, features for directing and circulating multiple coolants, i.e., the first and second grooves or passages 60, 62.

Figure 3:
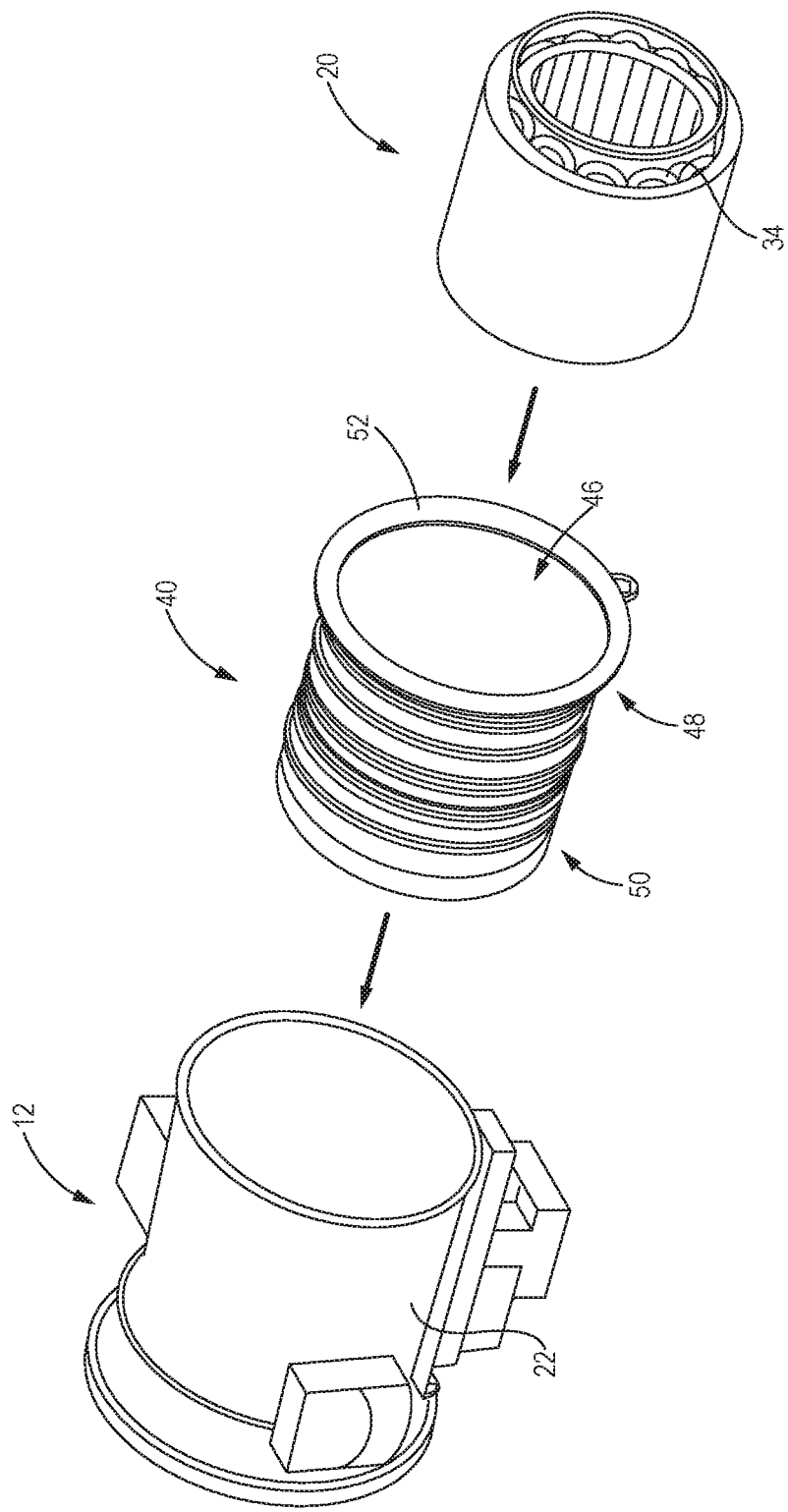
FIG. 3 is an exploded perspective view of the exemplary electric machine of FIG. 1, including a stator, a cooling jacket and a housing, in accordance with the present disclosure.

Turning to FIG. 3, illustrated is an exploded or disassembled view of certain components of the electric machine 10 of FIG. 1, including the housing 12, the cooling jacket 40 and the stator 20. As illustrated in FIGS. 1 and 3, the cooling jacket 40 is received in the housing 12, and the stator 20 is received in the cooling jacket 40, all in a coaxial fashion. Contacting the outer surface 44 of the cooling jacket 40 (having the above-described grooves 60,62 therein) with the shell 22 of the housing 12 establishes the first and second passages 60, 62 and the corresponding first and second coolant flow paths for circulating two coolants through the cooling jacket 40. The cooling jacket 40 is sealed within the housing 12 in a manner intended to prevent the first and second coolants from escaping their respective passages 60, 62. Appropriate orientation/alignment of supply and discharge ports (detailed below) with the coolant passages 60, 62 may take place by appropriately orienting the cooling jacket 40 and the housing 12 during the guiding of the cooling jacket 40 into the housing 12. As discussed above, the cooling jacket 40 may be bolted to the housing 12 via flange 52, or attached by any other suitable means. The cooling jacket 40 may also be coupled with the housing 12 via press fitting.

Figure 5:
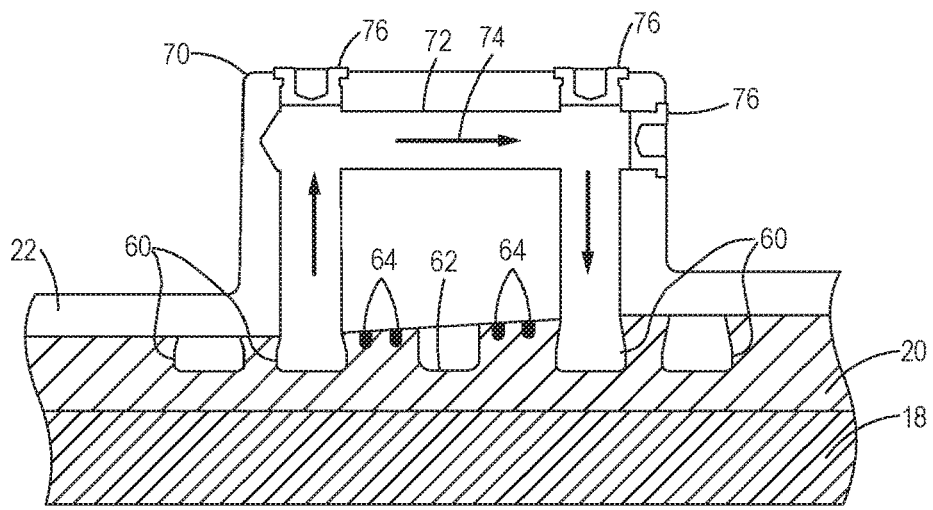
FIG. 5 is a cross-sectional illustration of a bypass component disposed on the exterior surface of an electric machine housing, in accordance with the present disclosure.

In addition to the surface-to-surface contact between the outer surface 44 of the cooling jacket 40 and the shell 22 of the housing 12, one or more O-rings 64 may also be used to add further contact between the components, and to form additional seals between the cooling jacket 40 and the housing 12 (see FIGS. 1 and 5). Such O-rings 64 may be positioned in additional grooves on the outer surface 44 of the cooling jacket 40. As described above and further detailed below, the presently disclosed configuration allows for multiple coolants to simultaneously flow axially through the cooling jacket 40. Because different coolants are supplied from independent sources and are responsible for different cooling functions, the different coolants should be isolated not be allowed to mix within the cooling jacket 40. Aside from the surface-to-surface seal between the cooling jacket 40 and housing 12, the O-rings 64 provide additional seals between the first and second coolant passages 60, 62. In this manner, cross contamination of the different coolant fluids is prevented. Specifically, despite the surface-to-surface seal between the between the cooling jacket 40 and housing 12, should any coolant fluid escape its respective passage 60, 62, the O-rings 64 may prevent any further movement of the coolant and therefore prevent contamination of the coolant in an adjacent passage. Any number of O-rings 64 may be employed between the cooling jacket 40 and the housing 12; and while the O-rings 64 are only illustrated herein as disposed between the first passages 60 and the centered second passage 62, O-rings may also be disposed on opposite sides of the first passages 60, as well as between any additional coolant passages in the cooling jacket 40.

The stator 20 may be received within the cooling jacket 40 such that the stator 20 is in heat transference contact with the inner surface 42 of the cooling jacket 40. It may be desirable to place the stator 20 in the cooling jacket 40 prior to placing the cooling jacket 40 within the outer housing 12. In this case, the cooling jacket 40 may be expanded by heating, the stator 20 placed therein, and then the cooling jacket 40 allowed to cool and thereby shrink about the stator 20. The stator 20 may include first and second axial ends, and may be retained within cooling jacket 40 such that the first and second axial ends of the stator 20 are substantially aligned with the first and second axial ends 48, 50 of the cooling jacket 40. Further, as commonly understood in the art, and therefore not described in detail herein, a suitable electrical generator rotor 18 or motor rotor 18 may be positioned within the stator 20, and an input coupling or output coupling, respectively, connected therewith.

Figure 4:
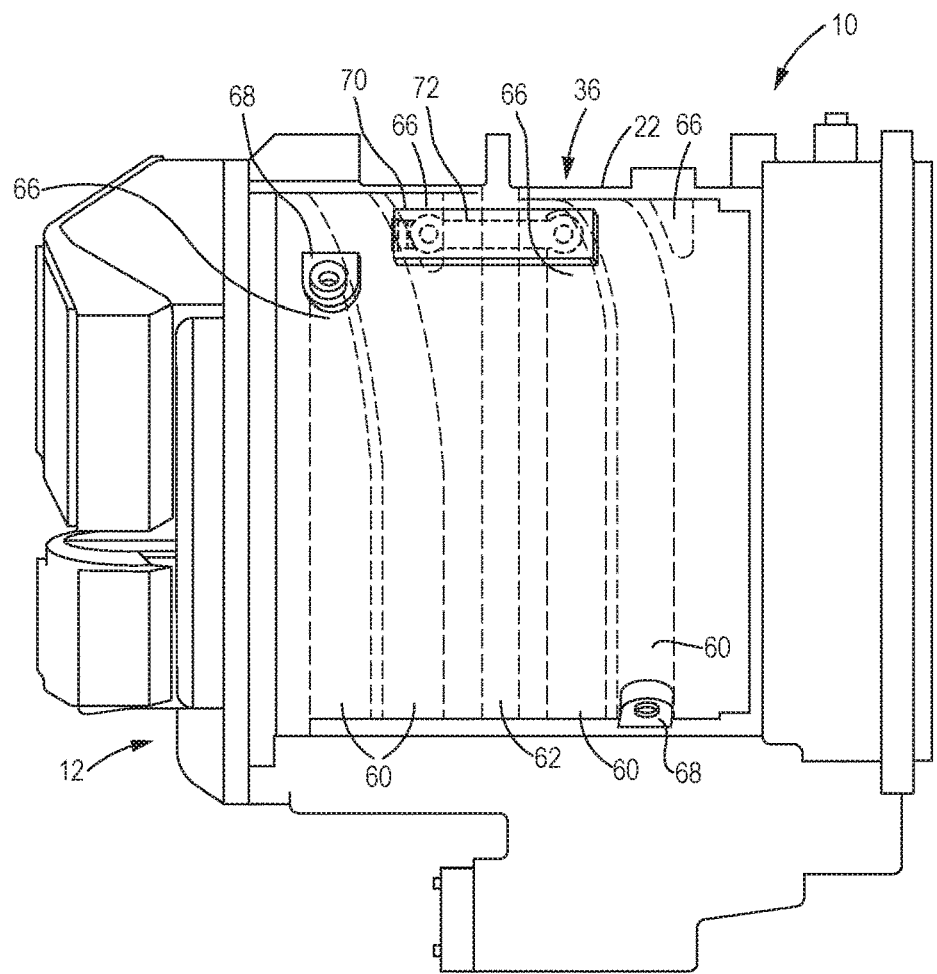
FIG. 4 is a view of the exterior of the exemplary electric machine of FIG. 1, various passages of the cooling assembly within the electric machine illustrated by broken lines, in accordance with the present disclosure.

FIG. 4 shows an exterior view of the assembled electric machine 10 and housing 12. The cooling jacket 40, being hidden within the housing 12, is not specifically referenced; however, the first and second coolant passages 60, 62 of the cooling jacket 40 are depicted in shadow beneath the shell 22 of the housing 12 using broken lines. In this exemplary embodiment, the ends 66 of the two sets of first coolant passages 60 are depicted, the passages 60 advancing axially and making two turns around the cooling jacket 40 and stator 20 (also invisible in this view). Alternatively, only a single second passage 62 is included in this embodiment, the second coolant passage 62 being disposed between the first coolant passages 60. Though not depicted, additional first and second coolant passages 60, 62, of any number and placement axially on the cooling jacket 40, are within the scope of this disclosure, as described above.

The exterior of the housing 12 may be adapted with ports 68 that extend through the housing 12 and are in fluid communication with the first passages 60, thereby facilitating supplying and/or evacuating the first coolant from the first passages 60. Likewise, though not depicted in FIG. 4, the housing 12 may also include additional ports for supplying/evacuating the second coolant of the second passage 62. It should be understood that, in use, the first and second coolants may be pressurized by a pump (not shown) and directed into one of the ports 68 for circulation through the cooling jacket 40. The machine housing 12 and passages 60, 62 may be adapted with any number of ports 68, whether inlet or outlet ports, depending on the particular application and needs. In the presently depicted embodiment, a first coolant may enter one port 68 and be directed along the first passages 60 to another port 68, such ports functioning as inlet and outlet ports, respectively.

It should be understood that the disclosed configuration allows for the direction of coolant flow to be reversed, if so desired. In other contemplated embodiments, the coolant passages are adapted with additional inlet and outlet ports allowing for coolant circulation in multiple directions simultaneously. When filling the passages 60, 62 with first or second coolants from, for example, first and second coolant reservoirs or other supply locations, one of the ports 68 may be used for purging air while the other port 68 receives and supplies coolant. The ports 68 may allow for resupply of coolant and a continuous fluid flow path through the cooling jacket 40, from one port to another, as commonly understood in the industry. Coolants exiting the electric machine 10 may be directed to a heat exchanger where the absorbed heat can be transferred to the atmosphere before the coolants are returned back to the electric machine 10, as commonly practiced in the industry. In addition, the housing 12 may also be adapted with a vent (not shown) for purging air, oil, etc. from the housing 12 of the electric machine 10, as also commonly known in the industry.

With further regard to the cooling assembly 36 of the present disclosure, FIGS. 4 and 5 also illustrate a bypass component 70 disposed on the housing 12 of the electric machine 10. Such a bypass component 70 may include a third passage 72 that extends through the housing 12 to fluidly connect both sets of first passages 60 by "jumping over" the second passage 62. FIG. 4 illustrates an exterior of the bypass component 70 on the surface of the machine housing 12, the third passage 72 being illustrated in shadow using broken lines. FIG. 5, alternatively, illustrates a cross-sectional view of the bypass component 70 demonstrating how the third passage 72 aligns with and is in fluid communication with the first passages 60. Specifically, the bypass component 70 is disposed on the machine housing 12 such that the third passage 72 aligns with ends 66 of otherwise independent sets of first coolant passages 60. In this manner, by connecting the sets of first passages 60 and bypassing the second passage 62, the third passage 72 provides a first coolant flow path 74 around the second passage 62 allowing for first coolant flow axially from one end of the cooling jacket 40 to the other while a second coolant flows in between first coolant flow paths.

The bypass component 70 may be an elongated, block-type structure that is cast and integral with of the machine housing 12, as illustrated. Alternatively, a separately fabricated bypass component may be fastened to an exterior surface of the housing 12. Such a bypass component may be of the same material as the housing 12, or of any other material known in the industry. In the illustrated embodiment, the third passage 72 is machined into the bypass component 70. Specifically, the third passage 72 is created by drilling into the bypass component 70 at three locations, and also through the housing 12 at two locations to ultimately yield three intersecting passages, two of which also intersect with and create the fluid communication between the sets of first passages 60, as illustrated in FIG. 5. This configuration requires precise alignment of the bypass component 70 with the first passages 60 so that the third passage 72 extends through the housing 12 to fluidly connect the sets of first passages 60. As also illustrated, plugs 76, or any suitable means, may be incorporated in the bypass component 70 to plug or seal off the exposed ends of the machined third passage 72, thereby rendering the continuous first coolant flow path 74 between the first passages 60.

As mentioned, the bypass component 70, rather than being integral with the housing 12, may be attached to the housing surface using any suitable fastening means. For example, the bypass component 70 may be an independently casted component of similar shape to that depicted, and having the third passage 72 therein. Such a bypass component and third passage may be aligned with holes extending through the machine housing 12 to intersect with the first passages 60, and thereafter fastened to the housing 12. This configuration would also provide the continuous coolant flow path 74 between the first passages 60 and around the second passage 62. Any number of configurations that may fulfill this function are contemplated herein. For example, another alternative embodiment may include the attachment of a tube or pipe to the exterior surface of the housing 12 to provide fluid communication between certain passages and around others. Attachment of such tubing or piping may include any suitable fastening means known in the industry capable of providing a fluid tight seal between the passages.

Where such independent bypass components are concerned, retrofitting existing electric machines with elements of this disclosure is also contemplated herein. Specifically, where existing machines include cooling jackets having multiple, axially advancing coolant passages, such machines may be retrofitted with the disclosed bypass components to allow for multiple coolant flow paths through the cooling jacket without cross contamination of the coolants. Accordingly, further contemplated herein are kits for retrofitting existing electric machines with elements of the present disclosure. Specifically, such a kit may include a bypass component 70 and any necessary fastening means (including, but not limited to, additional tubing, bolts, flanges, brackets, ties and clamps) for attaching the bypass component 70 so that it fluidly connects certain passages while bypassing another. It should be understood that any such adaption of existing electric machines may further require the incorporation of additional ports and/or other components.

Moreover, as mentioned above, within the scope of the present disclosure are electric machines having cooling jackets with additional and alternative first and second passages and/or series of first and second passages. In this regard, it is also contemplated herein that multiple bypass components may be used on a machine housing to fluidly connect passages of the same coolant. For example, should the illustrated cooling jacket 40 be adapted with additional second passages at the axial ends 48, 50 of the cooling jacket 40, opposite the first passages 60, one or more of the disclosed bypass components 70 could be used to fluidly connect the additional second passages with the centered second passage 62. Depending on the specific cooling jacket design and the heat transfer requirements, any number of bypass configurations between one or more like coolant passages using bypass components are possible and contemplated in the present disclosure.

Figure 6:
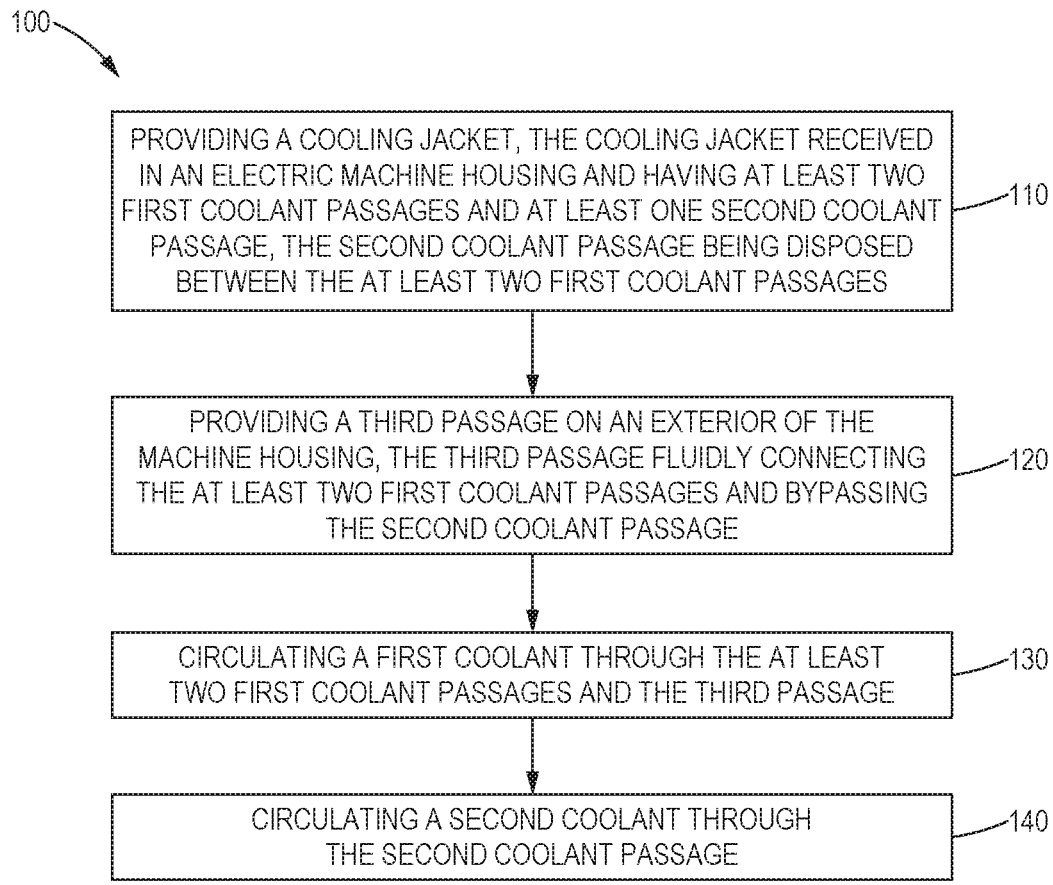
FIG. 6 is a flow chart for a method of cooling an electric machine, in accordance with the present disclosure.

FIG. 6 shows a flow chart for a method of cooling an electric machine 10. FIG. 6 is discussed in more detail in the following section to further illustrate the disclosed methods and concepts.

INDUSTRIAL APPLICABILITY

The disclosed cooling assembly 36 for an electric machine 10 finds potential application in any electric motor or generator where it is desirable to dissipate substantial amounts of heat in a controlled and uniform manner. The cooling assembly 36 disclosed increases the cooling efficiency of the electric machine 10 without substantially increasing the size or weight of the electric machine 10. The cooling assembly and methods disclosed herein may be used in any environment, including electric machines used on mobile vehicles or in stationary applications. Work environments that may employ electric machines adapted with the disclosed cooling assembly may include mining, locomotive, farming, transportation, construction and so on. Within such applications, the disclosed principles apply to cooling of the stator 20 of the electric machine 10 using two independent coolant fluids in the same cooling jacket 40, as detailed below.

Turning to FIG. 6, a flow chart for a method 100 of cooling an electric machine 10 is shown. The disclosed method 100 begins with, at step 110, providing a cooling jacket 40, the cooling jacket 40 received in an electric machine housing 12 and having at least two first coolant passages 60 and at least one second coolant passage 62, the second coolant passage 62 being disposed between the at least two first coolant passages 60. As described above with reference to FIGS. 1-5, the cooling jacket 40 receives the stator 20 and the rotor 18 of the electric machine 10. Further, the cooling jacket 40, the stator 20 and the rotor 18 are all disposed coaxially within the electric machine housing 12. In this manner, the cooling jacket 40 is positioned between the heat generating stator 20 and the housing 12 of the electric machine 10 in a heat transference capacity.

The disclosed cooling jacket 40 dissipates heat from the stator 20 using two different coolants, each coolant flowing through independent coolant circuits or passages 60, 62. The first coolant, which circulates through the first passages 60, may be a water and ethylene glycol mixture (as well as other components), also called WEG coolant. This first WEG coolant functions primarily to cool the stator 20 by circulating around the cooling jacket 40 while also advancing axially through the cooling jacket 40, which directly contacts the stator 20 in a heat transference manner. Continuous first coolant circulation through the cooling jacket 40 may be further facilitated by the resupply and evacuation of the first coolant from a first coolant reservoir through inlet and outlet ports 68. The second coolant, which circulates through the second passage 62, may be an oil-based coolant comprising any type of oil, transmission fluid or lubrication fluid. This second coolant may function to cool the internal components of the electric machine 10, including the coils or windings 34 of the stator 20. Like the first coolant, the second coolant may circulate around the cooling jacket 40, and though not depicted, may also circulate axially through the cooling jacket 40. In addition, the second oil coolant may be allowed to seep through the second passage 62 of the cooling jacket 40 and into the stator 20, thereby contacting and cooling the windings 34 of the stator 20, as commonly practiced in the industry. The second oil coolant may also be resupplied and/or evacuated through ports on the housing that are in fluid communication with second passage 62.

As described above, the disclosed cooling jacket 40 may be designed with any number of grooves corresponding to first and second passages 60, 62. The first and second passages 60, 62 may be disposed in an axially alternating order along the length of the cooling jacket 40. Further, sets of any number of passages 60, 62 may be included. As illustrated in FIGS. 1, 2, 4 and 5, the cooling jacket 40 may include the following order of axially advancing passages: a set of first passages 60 spiraling twice around the cooling jacket 40, a second passage 62 around the cooling jacket 40, and another set of first passages 60 spiraling twice around the cooling jacket 40. In this manner, advantageously, the second coolant may be circulated in between circulation passages 60 of the first coolant. Further, the spiral of the first passages 60 (and potentially the second passages 62) may provide even, distributed cooling along the length of the stator 20.

In order for the first coolant to be circulated between the two illustrated sets of first passages 60, a third passage 72 that bypasses the intervening second passage 62 is provided. The method 100 of cooling an electric machine 10 therefore includes, as step 120, providing a third passage 72 on an exterior of the machine housing 12, the third passage 72 fluidly connecting the at least two first coolant passages 60 and bypassing the second coolant passage 62. This third passage 72 may be part of a bypass component 70 disposed on an exterior of the housing 12 in a manner that is integral with the housing 12, or may instead be fastened to the housing 12. In any case, the third passage 72 provides fluid communication between the at least two first passages 60 and around the second passage 62. As illustrated throughout the figures, this bypass configuration advantageously allows for two alternating coolants to be simultaneously circulated axially along the length of the cooling jacket 40. Further, depending on the groove or passage design of a particular cooling jacket, as well as the heat transference needs thereof, the electric machine may be adapted with any number of bypass components 70 that connect like coolant passages, including oil passages that bypass WEG passages.

Steps 130 and 140 of the method 100 for cooling an electric machine 10 require, respectively, circulating a first coolant through the at least two first coolant passages 60 and the third passage 72, and circulating a second coolant through the second coolant passage 62. As described above, the first coolant may be a WEG coolant intended to primarily cool the stator 20 in a heat transference manner, while the second coolant may be an oil coolant intended to primarily cool the windings 34 of the stator 20 through heat transference and direct contact. Cross contamination of these two coolants circulating simultaneously through the cooling jacket 40 should be avoided. To this end, the disclosed cooling assembly 36 may further include O-rings 64 disposed radially between the cooling jacket 40 and the shell 22, and axially between first and second passages 60, 62, as illustrated in FIGS. 1 and 5. In this manner, in addition to the passages 60, 62 being sealed off from each other via the surface-to-surface contact between the outer surface 44 of the cooling jacket 40 and the shell 22 of the housing 12, the passages 60, 62 are further sealed off from one another by the incorporation of the O-rings 64. This configuration advantageously allows for axially alternating circulation of the two independent coolants in isolation throughout the cooling jacket 40 without the mixing or contamination of either coolant. While not illustrated as such, O-rings 64 may be incorporated anywhere along the axial length of the cooling jacket 40, most especially between alternating first and second passages 60, 62.

The present disclosure also provides for retrofitting existing electric machines with a bypass component 70. For example, depending on the particular heat transference needs, an existing electric machine having a cooling jacket with grooves therein for circulating coolant fluid(s) may potentially be adapted with one or more bypass components 70. In this regard, also contemplated herein is a kit including the bypass component 70, as well as any attachment means necessary for adapting an existing electric machine with the bypass component 70. Additional ports may also be added, if needed, to facilitate the continuous circulation of two different coolants along the length of the cooling jacket, as well as to vary the number and sequence of the potentially alternating coolant passages. In addition, existing electric machines may be adapted with an entirely new cooling assembly of the present disclosure. For example, an existing, conventional electric machine may be disassembled and thereafter adapted and reassembled with the presently disclosed cooling assembly, including the cooling jacket 40 and the bypass component 70. In these various manners, the present disclosure offers the potential for upgrading existing electric machines.

By directing two different coolants through adjacent coolant passages 60, 62 disposed axially along the length of the cooling jacket 40, the above-disclosed cooling assembly 36 and method 100 may provide greater cooling efficiency of an electric machine 10. Specifically, a first WEG coolant for cooling the stator 20, along with a second oil coolant for cooling the windings 34, provides cooling to the components of the electric machine 10 that tend to generate the greatest amounts of heat. In turn, any heat-induced stresses or damage experienced by the components of electric machines having conventional cooling jackets may be reduced.

All references to the disclosure or examples thereof are intended to reference the particular example being discussed at that point and are not intended to imply any limitation as to the scope of the disclosure more generally. Also, it will be apparent to those skilled in the art that various modifications and variations can be made to the cooling assembly of the present disclosure without departing from the scope of the disclosure. Other embodiments will be apparent to those skilled in the art from consideration of the specification and practice of the embodiments disclosed herein. The particular arrangement used for a given application will depend on size, heat transfer requirements and possible other factors. Accordingly, it is intended that the disclosure be considered as exemplary only, and embracing all alternatives, modifications and variations, which fall within the spirit and scope of the appended claims.

What is claimed is:

1. An electric machine, comprising:
    a housing having an exterior surface;
    a shaft rotatably supported within the housing;
    a rotor operatively coupled to rotate with the shaft;
    a stator annularly surrounding the rotor; and
    a cooling assembly, including:
        a cooling jacket disposed in the housing, the cooling jacket having an inner surface defining a generally cylindrical cavity for receiving the stator and an outer surface having first and second first coolant grooves for circulating a first coolant, and a second coolant groove for circulating a second coolant, the second coolant groove being disposed between the first and second first coolant grooves; and
        a bypass passage fluidly communicating between the first and second first coolant grooves, the bypass passage including a portion extending through the housing while bypassing around the second coolant groove, thereby to prevent cross-contamination of the first coolant and second coolant.

2. The electric machine of claim 1, wherein the first coolant comprises water.

3. The electric machine of claim 1, wherein the second coolant comprises oil.

4. The electric machine of claim 1, further comprising one or more O-rings disposed between the first and second first coolant grooves and the second coolant groove.

5. The electric machine of claim 1, wherein the bypass passage is in a bypass component formed integral with the housing.

6. The electric machine of claim 1, further comprising one or more coolant inlet ports and one or more coolant outlet ports for supplying and evacuating the first or second coolants.

7. The electric machine of claim 1, wherein the electric machine is retrofitted with the bypass passage.

8. A cooling assembly for an electric machine, comprising:
   a housing having an exterior surface;
   a generally cylindrical cooling jacket configured to be disposed in the housing and to receive a shaft, a rotor and a stator;
   first and second first coolant passages formed in the cooling jacket for circulating a first coolant;
   a second coolant passage formed in the cooling jacket for circulating a second coolant, the second coolant passage being disposed between the first and second first coolant passages; and
   a bypass passage fluidly communicating between the first and second first coolant passages, the bypass passage including a portion extending through the housing while bypassing around the second coolant passage, thereby to prevent cross-contamination of the first coolant and second coolant.

9. The cooling assembly of claim 8, wherein each of the first and second first coolant passages is configured to circulate a water and ethylene glycol-based first coolant.

10. The cooling assembly of claim 8, wherein the second coolant passage is configured to circulate an oil-based second coolant.

11. The cooling assembly of claim 8, further comprising one or more O-rings disposed on the cooling jacket between the first and second first coolant passages and the second coolant passage.

12. The cooling assembly of claim 8, wherein the bypass passage is part of a kit for retrofitting an existing electric machine.

13. A method of cooling an electric machine, comprising the steps of:
   providing a cooling jacket, the cooling jacket received in an electric machine housing and having first and second first coolant passages and a second coolant passage, the second coolant passage being disposed between the first and second first coolant passages;
   providing a bypass passage arranged to fluidly communicate between the first and second first coolant passages, the bypass passage including a portion extending through the housing that bypasses around the second coolant passage, thereby to prevent cross-contamination of a first coolant and a second coolant;
   circulating the first coolant through the first and second first coolant passages and the bypass passage; and
   circulating the second coolant through the second coolant passage.

14. The method of claim 13, wherein the first and second coolants are circulated in isolation from one another.

15. The method of claim 13, further comprising the step of providing one or more O-rings between the first and second first coolant passages and the second coolant passage.

16. The method of claim 13, wherein the first coolant is a water and ethylene glycol-based coolant configured to cool a stator of the electric machine.

17. The method of claim 13, wherein the second coolant is an oil-based coolant configured to cool stator windings of the electric machine.

18. The method of claim 13, further comprising the step of providing ports in fluid communication with the first and second first coolant passages and the second coolant passage, respectively, the ports configured to resupply the first and second coolants for circulation through the cooling jacket.

* * * * *